Figure 1:
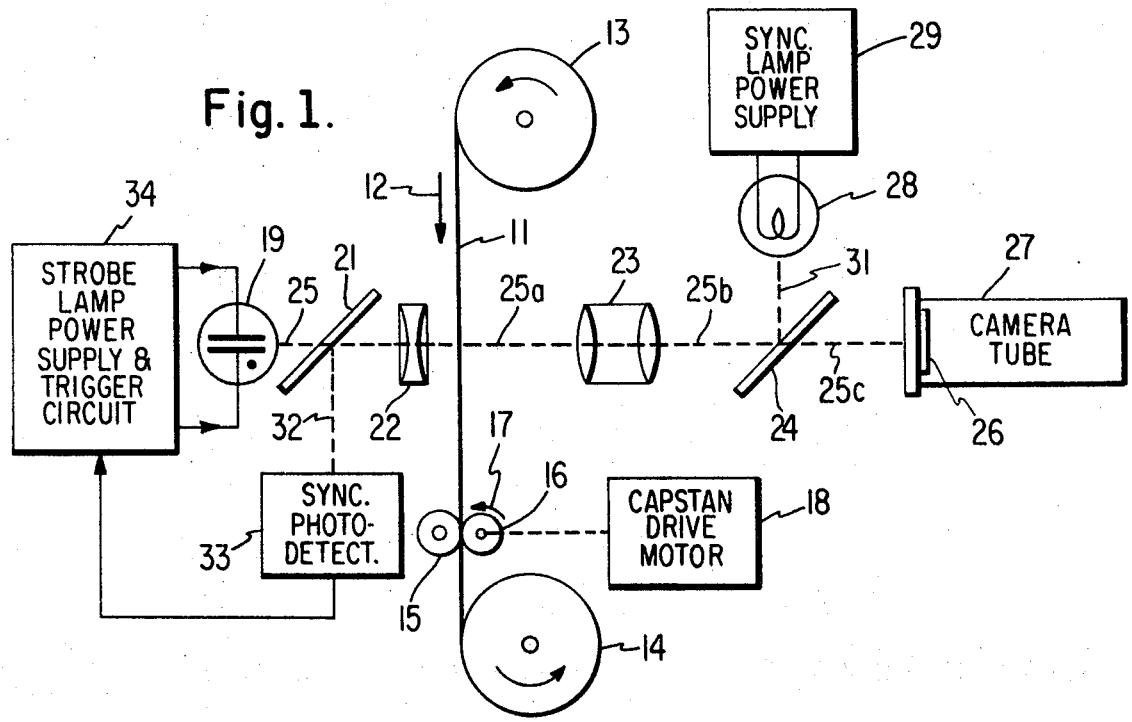

United States Patent

[11] 3,584,147

| [72] | Inventors | Robert Earl Flory<br>Princeton;<br>William James Hannan, Pennington, both of, N.J. |
|---|---|---|
| [21] | Appl. No. | 856,952 |
| [22] | Filed | Sept. 11, 1969 |
| [45] | Patented | June 8, 1971 |
| [73] | Assignee | RCA Corporation |

[54] CROSSTALK REDUCTION IN FILM PLAYER
7 Claims, 2 Drawing Figs.

[52] U.S. Cl. .................................................. 178/7.2,
178/DIG. 28, 178/6.7A
[51] Int. Cl. ...................................................... H04n 5/86
[50] Field of Search ............................................ 178/7.2, 6.7
A, 5.2 D, 7.2

[56] References Cited
UNITED STATES PATENTS

| 2,483,149 | 9/1949 | Norgaard | 178/7.2 D |
|---|---|---|---|
| 2,496,102 | 1/1950 | McCord | 178/7.2 D |
| 2,499,181 | 2/1950 | Downes et al. | 178/7.2 D |
| 2,834,832 | 5/1958 | Somers | 178/7.2 D |

*Primary Examiner*—Richard Murray
*Assistant Examiner*—John C. Martin
*Attorney*—Eugene M. Whitacre ABSTRACT: Light of a first color from a stroboscopic light source is transmitted forwardly toward a camera tube through a series arrangement of a first dichroic mirror, a condensing lens system, the image-bearing frames of a continuously moving motion picture film, a projecting lens system and a second dichroic mirror. Light of a second color from a continuous light source is reflected for transmission backwardly by said second dichroic mirror through said projecting lens system, a marginal strip of said film (in which is recorded information including synchronizing indicia) and said condensing lens system for reflection by said first dichroic mirror to a photodetector which responds to light of said second color representing said synchronizing indicia to develop triggering pulses for momentarily actuating said stroboscopic light source.

PATENTED JUN 8 1971   3,584,147

INVENTORS.
Robert E. Flory and
William J. Hannan.
BY Eugene M. Whitacre
ATTORNEY

CROSSTALK REDUCTION IN FILM PLAYER

BACKGROUND OF THE INVENTION

In one type of a continuously moving motion picture film projection system which has been used previously, short intense light flashes were directed intermittently through the image-bearing frames of the film to a storage-type television camera tube and continuous light was directed through a marginal strip of the film to illuminate synchronizing indicia recorded thereon adjacent respective image-bearing frames of the film so as to develop triggering pulses by photodetecting means for the momentary actuation of the source of the intense light flashes, during vertical blanking intervals, at the time that an image-bearing frame of the film was in position to be projected onto the camera tube. As used in this specification and in the claims the term "image-bearing frame" is defined as one in which there is a photographic record of an object or scene either (1) as a true positive or negative image or (2) as an encoded representation thereof as in systems such as in U.S. Pat. No. 2,733,291 granted Jan. 31, 1956 to R. D. Kell and in U.S. Pat. No. 3,378,633 granted Apr. 16, 1968 to A. Macovski. In such prior art film projection systems, however, the short intense light flashes and the continuous light were transmitted through the film in the same direction.

Such light transmission was accomplished by optical apparatus which included a condensing lens system located on the side of the film on which the two light sources were positioned and an objective projecting lens system located on the opposite side of the film where the camera tube and the photodetecting means were mounted. Even though the intense light flashes and the continuous light were of different colors and color selective dichroic mirrors were used to gather the light from the two sources and to selectively direct the light flashes and the continuous light respectively to the camera tube and to the photodetecting means, several difficulties were encountered which prevented such systems from operating in a completely satisfactory manner. What may be termed "crosstalk" between the two light systems was the major difficulty.

With both light sources located on the same side of the film it was practically impossible to confine each color light to its proper region of the film. Despite the spectral discrimination between the two colors of light effected by the use of dichroic mirrors, some of the intense flashes of light from the stroboscopic source of such light undesirably reached the photodetecting means, thereby producing an unstable operating condition thereof. Also, in those cases where the marginal strip of the film included a sound track and a separate photodetector was used to translate the film soundtrack into audio signals, such signals undesirably included spurious noise effects produced by the light pulses derived from the stroboscopic source. Another crosstalk deficiency of the described prior art system is that light derived from the continuous source must be undesirably limited in brightness so as to minimize the deleterious effect of such light reaching the image-bearing frames of the film. Any such light, of an intensity required to operate the photodetecting means in an optimum manner, which is scattered into the image-bearing frames of the film produces a smeared image of the continuously moving film upon the camera tube so that the video signals developed thereby include spurious effects.

Both of these crosstalk difficulties are encountered because the light from both of the sources is directed through the film by means of a condensing lens system which must have a relatively large aperture in order to uniformly illuminate the relatively large areas of the image-bearing frames of the film and, hence, is inherently of relatively low quality. It is not possible for such a lens system to confine an image of the continuous light source to the relatively small width of the filmstrip containing at least the synchronizing indicia. Thus, scattering of the continuous light onto the image-bearing film frames is unavoidable and, hence, its intensity must be undesirably limited in order to minimize the video signal contamination. The objective lens system located on the other side of the film to project light from the image-bearing frames, however, must be of relatively high quality in order to satisfactorily perform its function.

It, therefore, is an object of this invention to provide a novel continuously moving film projection system in which crosstalk between the light for illuminating the image-bearing frames and that for illuminating the marginal filmstrip regions including the synchronizing indicia is eliminated, or at least materially reduced, and in which no undesired limitation in the intensity of either light is required.

In accordance with the invention, the intermittent light source for illuminating the image-bearing frames of the film and the continuous light source for illuminating the synchronizing indicia, and any other information, recorded in the marginal filmstrip region are located on opposite sides of the film. The optical system comprises a series arrangement in a main light transmission path from an intermittently operated stroboscopic light source to the camera tube of a first dichroic mirror, the continuously moving motion picture film and a second dichroic mirror. Both the dichroic mirrors are angularly positioned relative to the main light transmission path and function (1) to direct light of a first color produced by the stroboscopic light source forwardly along the main light transmission path to the camera tube and (2) to direct light of a second color produced by the continuous light source backwardly along that part of the main light transmission path included between the two mirrors and also along two auxiliary light transmission paths branching respectively from the mirrors. The source of continuous light of the second color is located in the auxiliary light transmission path associated with the second dichroic mirror and photodetecting means responsive to light of the second color is located in the auxiliary light transmission path associated with the first dichroic mirror. Also, the main light transmission path of the optical system includes a condensing lens system located between the first dichroic mirror and the film and an objective lens system located between the film and the second dichroic mirror.

Figure 2:
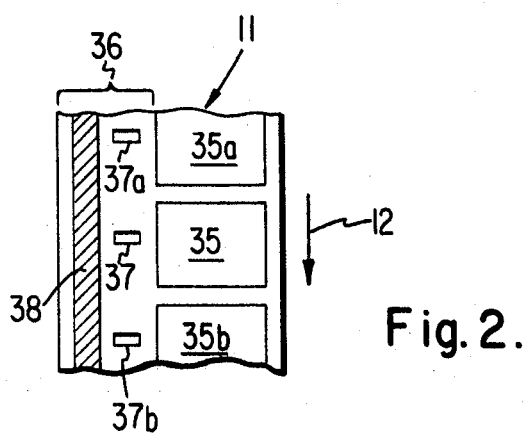

For a more specific disclosure of the invention, reference may be had to the following detailed description of a successfully operated illustrative embodiment which is given in conjunction with the accompanying drawing, of which:

FIG. 1 is a diagrammatic representation of one form of an optical apparatus embodying the invention; and FIG. 2 is a fragmentary section of a typical motion picture film which may be employed with the invention.

In FIG. 1 a motion picture film 11 is moved continuously in the direction of the arrow 12 from a supply reel 13 to a takeup reel 14 by any desired conventional transport means. In the transport means indicated in the drawing, the film 11 is urged by a pressure roller 15 into contact with a capstan roller 16 which is rotated in the direction of the arrow 17 by a capstan drive motor 18.

The optical apparatus embodying the invention includes a stroboscopic light source such as a xenon flashlamp 19, a first dichroic mirror 21, a condensing lens system 22, the film 11, an objective lens system 23 and a second dichroic mirror 24 for directing short, intense, intermittent light flashes through the film 11 along a main light transmission path 25, 25a, 25b and 25c to the photoconductive electrode 26 of a vidicon-type of camera tube 27. The light flashes emitted by the lamp 19 are essentially of a bluish color and the dichroic mirrors 21 and 24, which are positioned angularly relative to the main light transmission path 25, etc., are of a character to transmit blue light along this path. The optical apparatus of the invention also includes a continuous light source such as a tungsten filament lamp 28, energized by a power supply 29 and located in an auxiliary light transmission path 31 adjacent the second dichroic mirror 24. The light continuously emitted by the tungsten lamp 28 is essentially yellowish in color and the dichroic mirror 24 is of a character to reflect yellow light backwardly along the main light transmission path including sections 25a and 25b, through the objective lens system 23, the film 11 and the condensing lens system 22 to the first dichroic mirror 21. This mirror is of the same character as the second dichroic mirror 24 so that it reflects the yellow light through an associated auxiliary light transmission path 32 to a photodetector 33 which develops triggering pulses for impression upon the trigger circuit of a power supply 34 for the actuation of the flash lamp 19 at appropriate times and in a manner presently to be described.

The motion picture film 11 shown in this illustrative form of the invention is depicted in FIG. 2 as having a succession of image-bearing frames such as 35, 35a and 35b. The film also has a marginal strip 36 in which is recorded synchronizing indicia such as 37, 37a and 37b and, in some instances, a sound track 38. The synchronizing indicia 37, etc., (and the sound track 38 when present) are recorded in the marginal strip 36 of the film 11 adjacent the image-bearing frames 35, etc., to which they relate.

In the operation of the described optical apparatus the continuous yellow light from the tungsten lamp 28, which is directed backwardly along the main light transmission path sections 25a and 25b by the second dichroic mirror 24, is confined by the relatively high quality objective lens system 23 substantially entirely to the marginal strip 36 of the film 11. When, during a vertical blanking interval in the scanning of the electrode 26 of the camera tube 27, the image-bearing frame 35, for example, is in proper position to be projected onto the camera tube electrode 26, the continuous yellow light illuminates the synchronizing indicium 37 and the detection of the resultant light pulse by the photodetector 33 actuates the flashlamp 19 to produce the short, intense flash of blue light which is directed forwardly along the main light transmission path 25, etc., through the film frame 35 onto the camera tube 27 by the described optical apparatus. Even though the relatively large aperture of the condensing lens system 22 may allow some of the light flash from the lamp 19 to reach the synchronizing indicia 37, etc., and/or the sound track 38 in the marginal strip 36 of the film 11, the photodetector 33 is unaffected by such light because of its unique position in the optical apparatus of this invention. The image representative information of the film frame 35 is stored by the photoconductive electrode 26 of the camera tube 27 until it is scanned off by an electron beam in a known manner.

By directing the yellow light from the continuous light source lamp 28 backwardly along the main light transmission path sections 25a and 25b the relatively high quality objective lens system 23 is used so that the image of the light emitted by the lamp 28 is easily controlled in a manner to concentrate it substantially entirely onto the synchronizing indicia 37, etc., thereby improving the timing accuracy of the flashlamp triggering. Also, because of the use of the objective lens system 23 it is possible to produce a desired small line image of the continuous light source including the lamp 28 for use with any soundtrack 38 with which the film 11 may be provided. It, moreover, should be noted that no light from the continuous light source lamp 28 can reach the camera tube 27, except for whatever insignificant amount may be reflected from the film 11. This enables the use of continuous light from the lamp 28 having a sufficiently high intensity to effect optimum operation of the photodetector 33. Furthermore, by limiting the angle of light acceptance by the photodetector 33 substantially to that required to receive the yellow light directed by the condensing lens system 22 for reflection to the photodetector by the first dichroic mirror 21 very little, if any, of the blue light from the flashlamp 19 reaches the photodetector.

While FIG. 1 shows the specific arrangement of the components comprising the optical apparatus embodying the invention which is presently preferred, it is to be understood that other arrangements incorporating the principles of the invention and coming within the terms of certain ones of the following claims may be advantageously employed in particular cases. For example, in a first alternative arrangement the positions of the flashlamp 19 and the photodetector 33 may be interchanged, the other components remaining as shown in and described with reference to FIG. 1. In such first alternative arrangement, the first dichroic mirror 21 would be of a character to transmit yellow light and to reflect blue light and the main light transmission path would include the auxiliary light transmission path 32 of FIG. 1 and the auxiliary light transmission path associated with the mirror 21 would be the main light transmission path section 25 of FIG. 1. A second alternative arrangement may be the interchange of the positions of the camera tube 27 and the tungsten lamp 28, the other components remaining as shown in and described with reference to FIG. 1. In such second alternative arrangement, the second dichroic mirror 24 would be of a character to transmit yellow light and to reflect blue light and the main light transmission path would include the auxiliary light transmission path 31 of FIG. 1 and the auxiliary light transmission path associated with the mirror 24 would be the main light transmission path section 25c of FIG. 1. A third alternative arrangement may be the combination of both of the first and second alternative arrangements.

The novel optical apparatus embodying the invention, therefore, produces a significant increase in the signal-to-noise ratio of the synchronized flashlamp triggering circuit (and of the sound circuit with a film having a soundtrack) by enabling light of increased intensity to reach the photodetector 33 from the tungsten lamp 28 by the substantially eliminating, or at least minimizing, the amount of light reaching the photodetector from the flashlamp 19. Also, the virtual elimination from the camera tube 27 of light from the continuous light source lamp 28 obviates the formation of a smeared image of the continuously moving film 11 upon the photosensitive electrode 26, thereby enabling the development of video signals free of spurious effects.

What We claim is:

1. In a television system, optical apparatus for momentarily projecting onto a camera tube during vertical blanking intervals light from a stroboscopic light source through successively image-bearing frames of a continuously moving motion picture film also having, in a marginal strip adjacent said image-bearing frames, recorded information including synchronizing indicia related to said respectively adjacent frames, said optical apparatus comprising:

a series arrangement in a main light transmission path from said stroboscopic light source to said camera tube of a first dichroic mirror, said film and a second dichroic mirror, both of said dichroic mirrors being angularly positioned relative to said main light transmission path and functioning (1) to direct light of a first color emanating from said stroboscopic light source forwardly along said main light transmission path to said camera tube and (2) to direct light of a second color backwardly along that part of said main light transmission path between said mirrors and also along first and second auxiliary light transmission paths branching respectively from said mirrors;

photodetecting means located in said first auxiliary light transmission path adjacent said first dichroic mirror and responsive to light of said second color received from said first dichroic mirror and representative of said synchronizing indicia to develop triggering pulses for momentarily actuating said stroboscopic light source to produce short duration flashes of light of said first color for forward projection through said image-bearing frames of said film; and light producing means located in said second auxiliary light transmission path adjacent said second dichroic mirror for continuously supplying light of said second color to said second dichroic mirror for backward projection through said marginal strip-recorded information of said film and for direction by said first dichroic mirror onto said photodetecting means.

2. Optical apparatus as defined in claim 1, wherein:

said series arrangement also includes an objective lens system located in said main light transmission path between said film and said second dichroic mirror and functioning (1) to project forwardly to said camera tube light of said first color received from said image-bearing frames of said film and (2) to project backwardly to said marginal strip-recorded information of said film light of said second color received from said light producing means and said second auxiliary light transmission path associated with said second dichroic mirror.

3. Optical apparatus as defined in claim 2, wherein: said series arrangement also includes a condensing lens system located in said main light transmission path between said first dichroic mirror and said film and functioning (1) to project forwardly to said image-bearing frames of said film light of said first color received from said first dichroic mirror and said stroboscopic light source and (2) to project backwardly to said first dichroic mirror light of said second color received from said marginal strip-recorded information of said film for direction to said photodetecting means by said first dichroic mirror and said first auxiliary light transmission path.

4. Optical apparatus as defined in claim 3, wherein: at least one of said dichroic mirrors transmits light of said first color and reflects light of said second color.

5. Optical apparatus as defined in claim 3, wherein: both of said dichroic mirrors transmit light of said first color and reflect light of said second color.

6. Optical apparatus as defined in claim 3, wherein: said first dichroic mirror is of a character (1) to transmit only light of said first color along said main light transmission path toward said camera tube and (2) to reflect light of said second color received from said second dichroic mirror into said first auxiliary light transmission path and to said photodetecting means.

7. Optical apparatus as defined in claim 6, wherein: said second dichroic mirror is of a character (1) to transmit only light of said first color along said main light transmission path toward said camera tube and (2) to reflect light of said second color received from said second auxiliary light transmission path and said light producing means toward said first dichroic mirror.